Nov. 3, 1964
K. J. GERMESHAUSEN
3,155,113
AUTOMATIC MIXING DEVICE
Filed Feb. 5, 1962
2 Sheets-Sheet 1
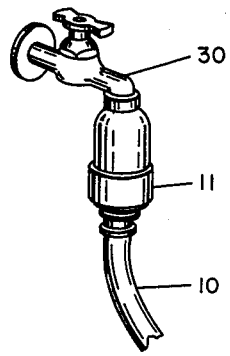
FIG. IB
FIG. IA
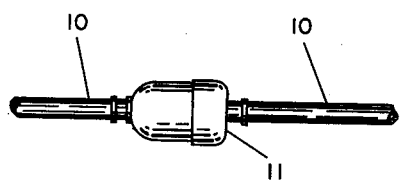
FIG. IC
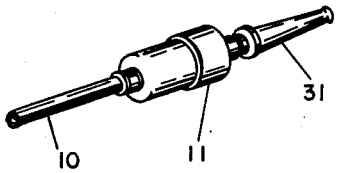
FIG. 2
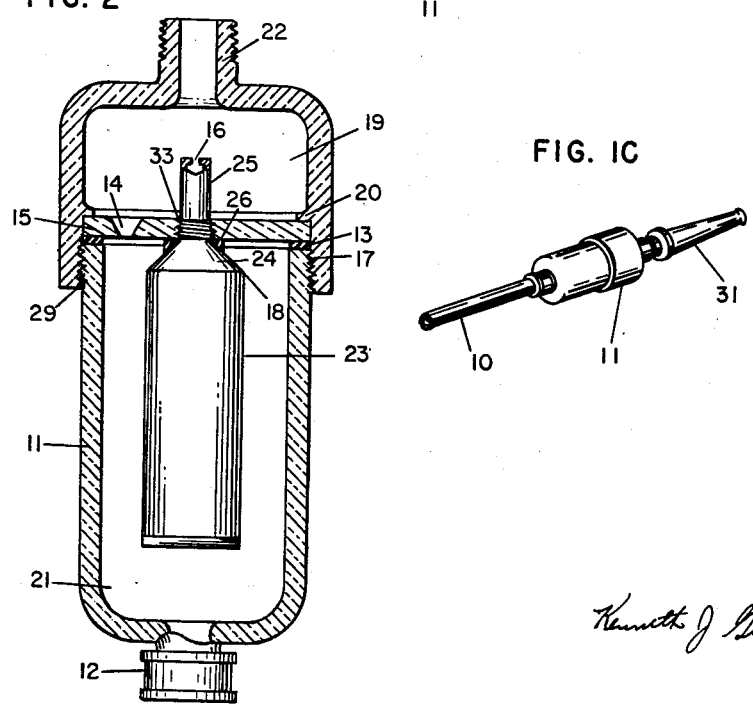
INVENTOR.
Kenneth J. Germeshausen Nov. 3, 1964  K. J. GERMESHAUSEN  3,155,113
AUTOMATIC MIXING DEVICE
Filed Feb. 5, 1962  2 Sheets-Sheet 2

INVENTOR.
Kenneth J. Germeshausen

United States Patent Office 3,155,113
Patented Nov. 3, 1964

3,155,113
AUTOMATIC MIXING DEVICE
Kenneth J. Germeshausen, Weston, Mass., assignor to Edgerton, Germeshausen & Grier, Inc., Boston, Mass., a corporation of Massachusetts
Filed Feb. 5, 1962, Ser. No. 174,342
1 Claim. (Cl. 137—564.5)

This invention relates in general to devices for mixing liquids, and, more particularly, to automatic devices for mixing liquids to substantially constant predetermined proportions. This application is a continuation-in-part of application Serial No. 53,466, filed September 1, 1960, now abandoned.

Heretofore, many automatic mixing devices have employed the principle of Bernoulli's theorem. In these devices, atmospheric pressure is utilized to introduce a static liquid into a dynamic liquid at a reduced pressure area created by the velocity of the dynamic liquid. Such devices were subject to numberous disadvantages. Notable among these disadvantages is that changes in the velocity of the dynamic liquid, caused, for example, by changes in line pressure, produce changes in the proportions of the two liquids in the resultant mixture. Another disadvantage of the prior art devices is that the mixing must be acomplished at or near the point of use of the liquid mixture since the liquids after mixing are at atmospheric pressure. A further disadvantage is that these devices required a container external to the conduit and connected thereto by a tube or hose, said external container being used to hold the static liquid which is to be intermixed with the dynamic liquid.

Other prior art devices have employed collapsible containers within the dynamic liquid to utilize the latter's pressure to exert a force upon the static liquid thereby causing it to flow from these containers into the dynamic liquid. These devices, like those mentioned above, suffer from the disadavntage that changes in the line pressure of the dynamic liquid cause considerable changes in the mixing ratios of the two liquids. Another disadvantage of these devices is that they are complicated devices having involved systems for passing the two liquids to the point at which they are mixed.

I have discovered, however, that the mixing ratios of two liquids can be maintained substantially constant at predetermined and preset proportions, notwithstanding variations in the line pressure of the dynamic liquid, if the pressure of the static liquid is made substantially equal to that of the dynamic liquid and remains substantially equal thereto as the pressure of the dynamic liquid varies.

It is, therefore, an object of this invention to provide a device of relatively simple construction for automatically mixing two liquids to substantially constant predetermined proportions, notwithstanding changes in the line pressure of the dynamic liquid.

A further object of the present invention is to mix the liquids within a single casing adapted for insertion into a conduit, said casing having no other external connections, tubes or containers.

An additional object of the invention is the provision for interchanging the containers holding the static liquids, to replace an empty container or change from one static liquid to another.

In summary, the invention consists of apparatus for mixing two liquids to substantially constant predetermined proportions employing a pressure-sensitive container for holding one of the liquids within the other liquid, the latter liquid being under pressure, so that the pressures of the two liquids are substantially equalized before mixing, predetermining the orifice sizes and characteristics to produce the said proportions, mixing the two liquids and passing the mixed liquids out of the container under pressure.

Other objects and a fuller understanding of the invention may be had by referring to the following description and claim, taken in conjunction with the accompanying drawings in which:

FIGURES 1A, 1B, and 1C are perspective views of the invention connected at different positions in a liquid-carrying system.

FIGURE 2 is an orthographic longitudinal section partially cut away to show some of the internal features of the invention.

Figure 4:
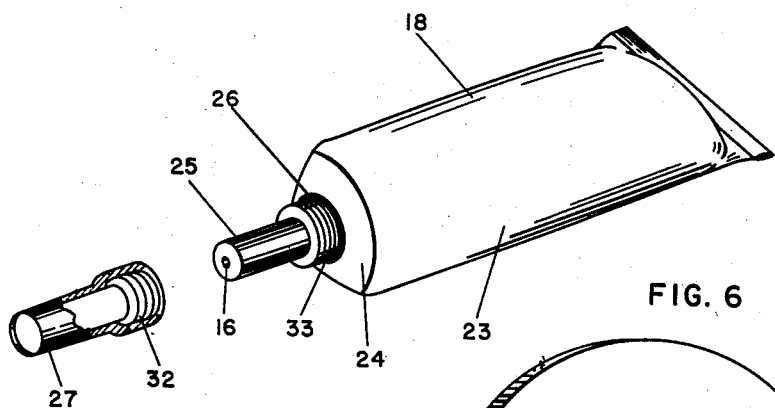

FIGURE 4 is a partially sectional perspective view of the pressure-sensitive container 18 and cap 27 which is used to seal the container when it is not in the casing 11.

Figure 5:
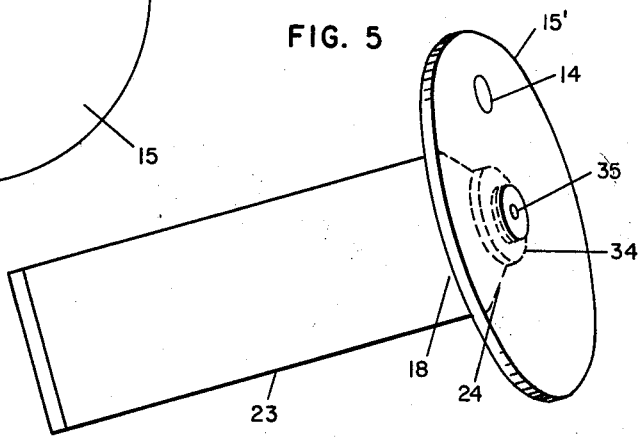

FIGURE 5 is a parallel perspective view showing a modification of the divisional plate 15 and the pressure-sensitive container 18.

Figure 6:
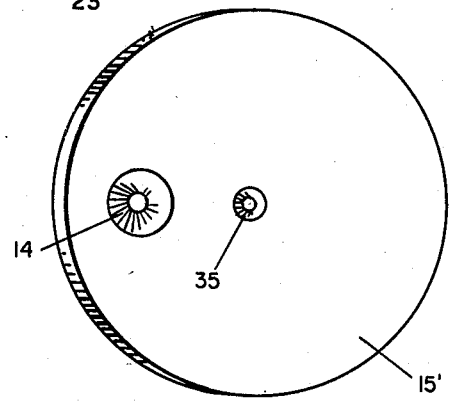

FIGURE 6 is a parallel perspective view showing the divisional plate 15' of FIGURE 5.

With reference to the drawings and for the purpose of describing the invention but in no way limiting it to this particular embodiment, the invention, as shown in FIGURE 1A, is inserted at an intermediate point along a liquid-carrying system which may be considered to be a garden hose 10, connected to a supply of liquid, for example, water, under household pressure. The invention may, however, be positioned at any convenient point in the hose system; for example, at the connection of the garden hose 10 to the water tap 30 as shown in FIGURE 1B; or at the outlet end of the garden hose 10 with or without the nozzle 31 shown in FIGURE 1C.

The invention comprises, in general, a hollow casing 11, consisting of two sections, an input section 21 and a mixing section 19. These two sections are connected in a leak-proof manner at 29 as shown in FIGURE 2. A transversely mounted divisional plate 15 separates the input section 21 from the mixing section 19. The divisional plate 15 is held firmly in place by the shoulder 20 of the mixing section 19 and the gasket 13, against which the end 17 of the input section 21 presses.

An orifice 14 in the divisional plate 15 permits the water to flow under pressure from the input section 21 to the mixing section 19.

Threadably attached to the divisional plate 15 and extending into the input section 21 is a pressure-sensitive container 18, holding a liquid such as a concentrated insecticide which is to be mixed with the water. The pressure-sensitive container 18 consists of a thin, soft, pliable, tube section 23 made, for example, from polyethylene, so that it is sensitive to pressure of the water in the input section 21 and susceptible of deforming when subjected to a difference of pressure between the water and the insecticide, until the pressure of the two liquids is substantially equal; and a rigid cone-shaped member 24 permanently sealed at its larger end to the pliable tube 23 by any well-known manner such as heat-sealing. The tube section 23 of the pressure-sensitive container 18 should be sufficiently flexible so that there is very little internal resistance within the walls of the container thereby permitting the force exerted upon the section 23 to be almost completely coupled to the liquid contained therein, and only a very small fraction thereof is utilized to overcome the container's internal resistance. The use of such a tube section 23 insures that the pressure of the two liquids are almost equal, and that any changes in the pressure of the water is instantaneously induced into the liquid within the container 18. A rigid member (not shown) may be attached to the cone-shaped member 24 to extend into the tube section 23 to prevent the latter from blocking orifice 14 when it is partially exhausted. The smaller end of the cone-shaped member 24 does not terminate in an apex but rather in an output member 25 which is in part threaded for attachment to the divisional plate 15. A gasket 26 is affixed to the small end of the cone-shaped member 24 to prevent leakage of the water from input section 21 through the threaded connection to the mixing section 19. The end of the output member 25, remote from the cone-shaped member 24, has an orifice 16 through which the liquid insecticide flows from the pressure-sensitive container 18 to the mixing section 19.

Figure 3:
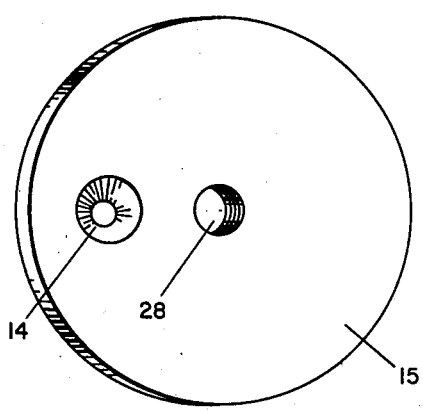
FIGURE 3 is a parallel perspective view showing the divisional plate 15 of FIGURE 2.

FIGURE 3 shows the divisional plate 15 with the orifice 14 and the threaded opening 28 which engages the threaded section 33 of output member 25 to firmly attach the pressure-sensitive container 18 to the divisional plate 15.

The pressure-sensitive container 18 may be removed from the casing 11 and replaced by a similar pressure-sensitive container holding a different liquid. It is not required that the container 18 be exhausted before it can be replaced. FIGURE 4 shows the pressure-sensitive container 18 removed from the casing 11, and a cap 27 which is used to seal the container 18 when it is not in use. The threads 32 of the cap 27 engage the threads 33 which are used primarily to attach the container 18 to the divisional plate 15 when the container 18 is in position within the casing 11.

FIGURE 5 shows a modification of the invention. The cone-shaped member 24 of the pressure-sensitive container 18 terminates in a flat metal cylinder 34 having a central opening. This metal cylinder 34 is integrally attached, by welding or the like, to the divisional plate 15′. An orifice 35 is located in the divisional plate 15′ within the area described by metal cylinder 34.

FIGURE 6 shows the divisional plate 15′ of FIGURE 5 with the orifices 14 and 35.

With reference to the drawings, the invention, as illustrated, operates as follows:

Water, under household pressure, flows through the garden hose 10 and the threadable connector 12 into the input section 21 of the hollow casing 11. The pressure of the water within the input section 21 deforms the pliable tube section 23 of the container 18 until the insecticide therein is under substantially the same pressure as the water. The water in the input section 21 passes through orifice 14 in divisional plate 15 and into the mixing section 19. At the same time, the insecticide in the container 18 passes through orifice 16 and into the mixing section 19. The water and the insecticide intermix in the mixing section 19 and flow through threadable outlet connector 22 under pressure.

A substantial part of the invention is that changes in the line pressure of the water do not change the proportion of water and liquid insecticide in the resultant mixture. This is true because the pressure of the liquid insecticide is substantially the same as the pressure of the water in the input section 21 as hereinbefore explained. Therefore, any changes in the pressure of the water in the input section 21 automatically induces a corresponding pressure change in the liquid insecticide in the pressure-sensitive container 18. Use of nozzle 31 to change the rate of flow of the mixture of the two liquids as it passes from the mixing section 19 will not affect the proportions of the two liquids in the resultant mixture.

An important feature of this invention resides in the fact that a predetermined ratio of the two liquids in the resultant mixture can be obtained for each combination of liquids. To demonstrate this fact, the following example is set forth. The volume of water Q, in cubic feet per second, flowing through an orifice is given by the following formula:

(1) $$Q = C\sqrt{2gH}\, A$$

where

C is the orifice coefficient of discharge
g is the gravitational constant
H is the head in feet, and
A is the cross-sectional area of the orifice in square feet.

To convert Formula 1 to more convenient units, the gravitational constant, 32.2 may be substituted for g, the head expressed in terms of pounds of pressure per square inch and the orifice area in square inches. Assuming that the orifice is a thin orifice, the coefficient of discharge is approximately 0.62. Incorporating these factors, Formula 1 may now be expressed:

(2) $$Q = 23a\sqrt{p}$$

where

Q is the volume of water in gallons per minute flowing through the orifice
a is the cross-sectional area of the orifice in square inches, and
p is the differential pressure of the liquid in pounds per square inch across the orifice.

Applying Equation 2 to the liquids passing through orifices 14 and 16

(3) $$Q_1 = 23a_1\sqrt{p_1}$$

and (4) $$Q_2 = 23a_2\sqrt{p_2}$$

where $Q_1$ and $Q_2$ are the volumes of liquids in gallons per minute flowing through orifices 14 and 16 respectively
$a_1$ and $a_2$ are the cross-sectional areas in square inches of orifices 14 and 16, respectively, and
$p_1$ and $p_2$ are the differential pressures in pounds per square inch across orifices 14 and 16 respectively.

The ratio of $Q_1$ to $Q_2$ is the proportion of the two liquids in the resultant mixture. Therefore, to obtain any desired proportion in the resultant mixture the following formula may be used.

(5) $$\frac{Q_1}{Q_2} = \frac{23a_1\sqrt{p_1}}{23a_2\sqrt{p_2}}$$

Since $p_1$ and $p_2$ are equal for the reasons hereinbefore mentioned Equation 5 can be simplified to:

(6) $$\frac{Q_1}{Q_2} = \frac{a_1}{a_2} = \frac{d_1^2}{d_2^2}$$

where $d_1$ and $d_2$ are the diameter in inches of orifices 14 and 16, respectively.

Consider the example of a household garden insecticide sprayer where the rate of flow of the mixture is 0.4 gallon per minute. With a pressure differential across orifice 14 of 5 pounds per square inch, then by Formula 2 diameter $d_1$ of orifice 14 would be 0.10 inch.

If the desired mixing proportion $Q_1/Q_2$ between the water and concentrated liquid insecticide is 25 parts water to 1 part insecticide, by using Formula 6, the diameter $d_2$ of orifice 16 would be (7) $$\frac{25}{1} = \frac{(0.10)^2}{d_2^2}$$

or (8) $$d_2 = 0.020 \text{ inch}$$

Thus, it can be seen that any reasonable mixing proportion may be obtained by varying the sizes of orifices 14 and 16 and that this proportion is independent of the line pressure, differential pressure, the rate of flow of the water in the line and the rate of flow of the resultant mixture.

It has thus been shown that, in the case where orifices 14 and 16 are thin orifices, the desired mixing ratio can be obtained by means of Equation 6. Obviously, this equation is useful whenever the coefficient of discharge of the two orifices is the same whether or not they are thin orifices. This is true because the quantity C in Equation 1 will cancel itself out when it appears in the numerator and denominator of Equation 5. I have discovered, however, that when the size of orifice 16 becomes very small, that is, less than about 0.016 inch, the coefficient of discharge is no longer a constant but rather it decreases as the orifice size decreases. This is due in all likelihood to the fact that there is greater friction or surface tension between the orifice walls and the liquid passing therethrough when the orifice opening is made smaller. This characteristic of very small orifices provides an even greater range of mixing ratios that may be preset for the two liquids particularly where very large ratios are desired, such as many hundreds of parts of water to one part of the insecticide. The invention is, of course, not limited to orifices of the same or similar discharge characteristics. Different orifices require only the added consideration of the ratios of the constants as shown in the following formula:

(9) $$\frac{Q_1}{Q_2} = \frac{a_1 C_1}{a_2 C_2}$$

The density of the fluids in question have not been taken into consideration because they have only a slight effect on the result due to the fact that the densities of the insecticides to be used are very close to that of water and would tend to give a ratio of approximately unity. Furthermore, only the square root of this factor would enter into the equation and would, therefore, be even closer to unity.

However, for the exceptional cases where the densities of the two liquids are considerably different, the following formula is useful in determining the sizes of the orifices:

(10) $$\frac{Q_1}{Q_2} = \frac{a_1 C_1}{a_2 C_2} \sqrt{\frac{W_2}{W_1}}$$

where $W_1$ and $W_2$ are the weights per unit volume of the liquids passing through orifices 14 and 16 respectively.

In the automatic mixing device shown in FIGURE 2, the cross-sectional area of orifice 14 and its coefficient of discharge is constant. The proportions of the liquid mixture are therefore a function of the cross-sectional area of orifice 16, the coefficient of discharge of orifice 16, and the square root of the ratio of the weight per unit volume of the insecticide to the weight per unit volume of the water. The orifice characteristic and cross-sectional area of orifice 16 can be predetermined to produce the desired ratio between the particular liquid encased in the container 18 and the dynamic liquid that is to be used. For this reason, different liquid insecticides having different weights per unit volume and needing different dilutions can be individually packaged in pressure-sensitive containers having the proper orifices. The containers can readily be inserted and removed from the divisional plate 15.

In FIGURES 5 and 6, the pressure-sensitive container 18 is integrally attached to the divisional plate 15′. By this modification, the orifice through which the liquid insecticide flows is a part of the divisional plate 15′. The divisional plate 15′ may be removed and replaced by a second such divisional plate with a different pressure-sensitive container, a different liquid contained therein, a different orifice 35 and a different orifice 14. When divisional plates 15′ are interchanged, a greater range in the proportions of the two liquids can be obtained because both orifices 14 and 35 can be varied in type and in cross-sectional area.

Although I have described my invention with a certain degree of particularity especially in the example of mixing a liquid insecticide and water, the invention is not to be construed as being so limited. This invention has more wide spread use in, for example, the mixing of chemicals in a closed system, mixing concentrated paints with a thinning agent, and mixture of liquid soaps and detergents with water for industrial cleaning applications, to name only a few. The advantages of this invention in these and other applications permits the holding of active agents in the pliable container 18 where they can be accurately mixed with a dynamic fluid notwithstanding changes in the line pressure of the dynamic liquid. For this reason different active agents can be commercially marketed in pliable containers having the proper orifice thereby eliminating any measuring or calibrating on the part of the user.

It is to be understood, therefore, that the present disclosure has been made only by way of example and that numerous changes in the details of construction and the combination and arrangement of parts may be resorted to without departing from the spirit and the scope of the invention as hereinafter claimed.

I claim as my invention:

An automatic mixing device for mixing a first liquid under pressure with a second liquid to substantially constant predetermined proportions notwithstanding variations in the pressure of the first liquid, comprising: a hollow casing having an input and an output connection; a divisional member transversely disposed within said casing dividing the casing into an input section having the input connection, and a mixing section having the output connection; a first orifice disposed in the divisional member for passing the first liquid from the input section to the mixing section; a pressure-sensitive container attached to said divisional member by a projection forming an integral part of said container for holding the second liquid within the input section without there intermixing the two liquids, and deforming when subjected to a difference in the pressures of the two liquids until the two liquids are at substantially equal pressures; and a second orifice disposed in said projection for passing the second liquid under pressure from said container through said divisional member to the mixing section where it intermixes with the first liquid before the mixed liquids pass under pressure through the outlet connection, said first and second orifices having preset cross-sectional areas and coefficients of discharge.

References Cited in the file of this patent

UNITED STATES PATENTS

| | | |
|---|---|---|
| 1,390,176 | Struve | Sept. 6, 1921 |
| 1,873,817 | Buddenhagen | Aug. 23, 1932 |
| 2,096,554 | Maehr | Oct. 19, 1937 |
| 2,305,023 | Moore | Dec. 15, 1942 |
| 2,581,424 | Dailey | Oct. 16, 1951 |
| 2,618,510 | Mills | Nov. 18, 1952 |